Sept. 23, 1969   C. A. MINNICK   3,467,973
MAGNETIC SPRING OR SHOCK ABSORBER DEVICE
Filed Sept. 28, 1967
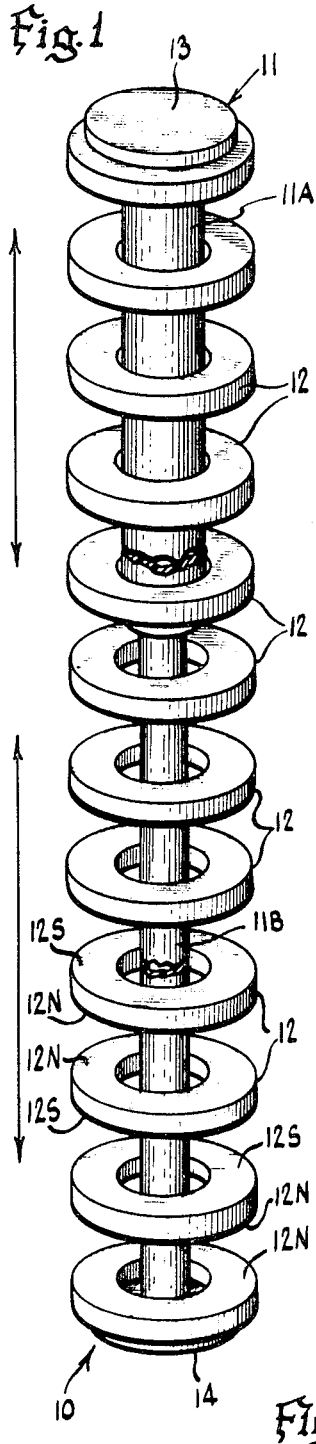
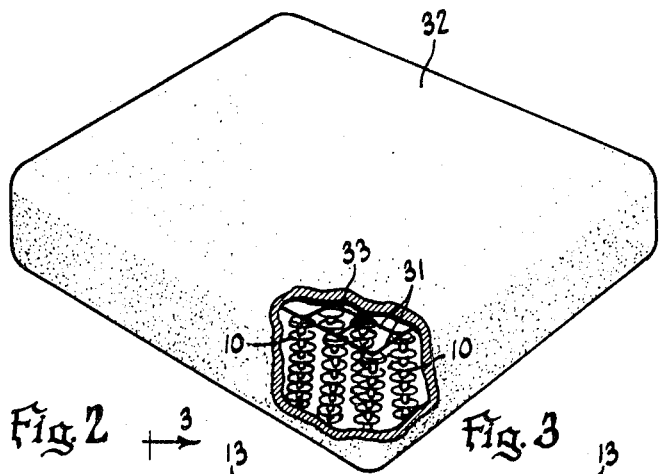
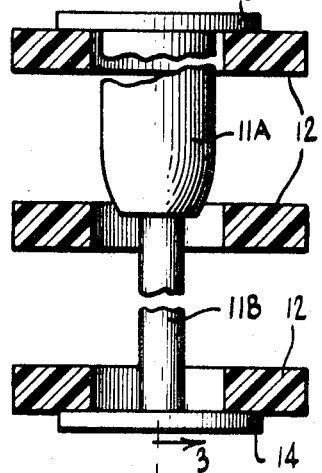
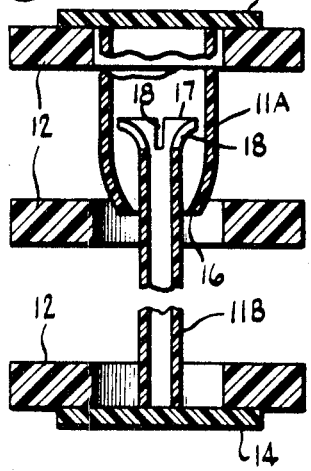
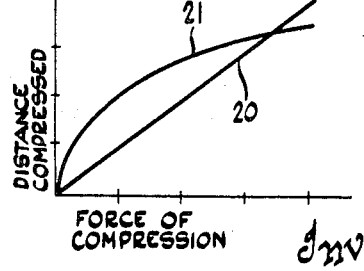
Inventor
CHRIS A. MINNICK
By Richard H. Kinney
Attorney

United States Patent Office 3,467,973
Patented Sept. 23, 1969

---

3,467,973
MAGNETIC SPRING OR SHOCK ABSORBER DEVICE
Chris A. Minnick, 844 W. Sunnyside,
Chicago, Ill. 60640
Filed Sept. 28, 1967, Ser. No. 671,476
Int. Cl. A47c *23/00, 7/30*
U.S. Cl. 5—351                                      10 Claims

ABSTRACT OF THE DISCLOSURE

Disclosed is a magnetic spring and/or shock absorber device comprising a number of annular-shaped permanent magnets, magnetized along the major annular central axis and mounted one atop on collapsible guide means. The central axis of all the magnets generally are aligned and the magnets are so oriented as to present like polarity surfaces to the adjoining magnets so as to repel the adjacent annulus. The guide means consists of a pair of telescoping nylon tubes that pass through the holes formed by the annulus and have provision for preventing the extreme annuli from leaving the array, and means for preventing the tubes from becoming disengaged from each other in normal use. The magnetic spring and/or shock absorber device resists compression and returns to its unloaded state after the removal of a load.

Also disclosed is one application of the spring: a magnetic spring mattress employing a large number of the magnetic springs mounted parallel and adjacent to one another.

SPECIFICATION

The present invention is directed toward a unique magnetic spring and/or shock absorber device, a unit that exhibits many of the properties of a conventional metal coil spring but is constructed entirely differently and operates under an entirely different principle.

BACKGROUND OF THE INVENTION

The general principles of magnetics have been well known for many years and have been applied in many fields and for many ends. In some of these applications, such as that illustrated in the United States patents to Littlefield, Patent No. 3,196,566, and Wrobel et al., Patent No. 2,585,714; an object is suspended and held by magnetic and gravitational forces. A necessary part of these arrangements are that a restoring force is applied when the suspended object is moved for at least small movements in some directions. However, no case is known in which these restoring forces are employed to achieve the end of absorbing and cushioning as well as suspending or supporting. It is one object of the present invention to provide an effective and efficient device that so employs these magnetic forces and does so without use of gravitational forces.

SUMMARY OF THE INVENTION

In achieving the above object a magnetic spring and/or shock absorber device is herein disclosed which constructed in accordance with the present invention comprises a plurality of magnets each of which is magnetized along an axis. The magnets are mounted adjacent to one another on guide means for receiving and guiding their movements and are so oriented that adjacent ones of said magnets repel each other.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIG. 1 is a perspective view, partly broken away, of a magnetic spring constructed in accordance with the present invention;

FIG. 2 is a partially sectional and partly broken elevational view of the magnetic spring of FIG. 1;

FIG. 3 is a sectional, partly broken elevational view of the magnetic spring of FIGS. 1 and 2, generally as seen from the line 3—3 of FIG. 2;

FIG. 4 is a graphical representation of some of the properties of the magnetic spring of FIGS. 1-4 and of a conventional spring illustrative of some of the differences in behavior between the two; and FIG. 5 is a perspective view, with parts broken away to show interior construction, of one application of the magnetic spring of FIGS. 1-3.

DESCRIPTION OF A PREFERRED EMBODIMENT

Referring to FIG. 1 there is depicted a magnetic spring constructed in accordance with the present invention and generally designated by the numeral 10. The spring 10 comprises guide means 11, including an upper member 11A and a lower member 11B, and a plurality of magnets 12. The means 11 is preferably collapsible, that is, it can be reduced or expanded in its longitudinal extent depending upon the loading of the magnetic spring 10. However for some applications of the magnetic spring it may not always be necessary that the guide means 11 to made collapsible.

Each of the magnets 12 are preferably formed in the shape of an annulus and are preferably formed of a permanent magnetic plastic material. The magnets 12 are all permanently magnetized along the major central axis of the annulus, that is, perpendicular to the plane of the annulus. In this manner each annular magnet 12 is magnetized so as to have one of its upper or lower surfaces function as a north pole, designated 12N in FIG. 1 and its other surfaces function as a south pole, designated 12S in FIG. 1.

The magnets 12 are preferably made of a plastic ceramic magnetic material so as to take advantage of this material's low weight. However, any magnetic material may be used successfully. Indeed any convenient means for generating a magnetic field corresponding in polarity to that of the magnet 12, such as electromagnets, might be employed.

Although the annular shape is preferred because it is easily made and its symmetry lends it to make easy fabrication those skilled in the art will appreciate that other shapes may be employed with varying guide means adapted to those shapes.

The guide means 11 preferably comprises a pair of telescoping hollow tubes with the tube of the lower member 11B being of a smaller diameter than that of the upper member 11A. It has retaining disc-shaped flanges at its upper and lower ends which are designated respectively 13 and 14. The discs 13 and 14 are preferably made integrally with the tube sections of their respective members 11A and 11B.

As better seen in FIG. 2, the diameters of the tube portions of both members 11A and 11B are so sized as to be somewhat less than that of the inside diameters of the annulus magnets 12 so as to allow them to freely fit thereon during assembly. The tube portions are of a sufficient size and stiffness so as to resist any tendency of the magnets 12 to turn through a plane parallel to the guide means 11.

The magnets 12 are positioned on the guide means 12 so that adjacent ones thereon have facing surfaces of the same polarity and thus repel one another. The repelling force drives adjacent ones of the magnets apart and provides a compression receiving force for the entire magnetic spring 10.

The guide means 11 is preferably made of a plastic material such as nylon that has low friction qualities, is slightly deformable without breaking and yet sufficiently strong and rigid to provide a generally linear guiding axis about which the magnets 12 are positioned and to resist and bend with sidewise forces and yet return to a normal configuration upon the withdrawal of such forces.

The guide means 11 must also provide means for preventing the members 11A and 11B from separating. As best shown in FIG. 4 this means comprises the construction of the tubular portion of member 11A to an opening 16 only slightly larger than the outside diameter of the tubular portion of the member 11B, and the flared end 17 of the member 11B. The flared end 17 is of a diameter greater than that of the opening 16 so as to normally prevent the exit of the member 11B from the member 11A, but is smaller than the normal inside diameter of the tubular portion (away from the opening 16) of the member 11A. This allows it to travel therein along the axis of the member 11A with a minimum of frictional resistance.

As mentioned before the guide means 11 is preferably constructed of a resilient plastic material such as nylon. To aid in assembling the guide means 11 the flaring portion 17 is provided with four spaced vertical slits 18. The slits 18 allow the flared portion 17 to be compressed for passage through the opening 16 during assembly of the magnetic spring 10. The retaining means also allows the members 11A and 11B to be separated, as when a sufficient force is supplied, the flared portion 17 will contract and pass out of the opening 16. This force is preferably sufficiently large so as to prevent accidental disengagement during normal use.

Referring now to FIG. 4, there is graphically illustrated the difference between the force of compression and distance compressed of a conventional metal spring and the spring 10. The metal spring, as indicated by the line 20, obeys Hooke's law over its normal expansion, and restoration range. That is, for every unit of compressive force applied the spring is compressed by a constant unit amount. Unlike the conventional spring, the magnetic spring 10 does not obey Hooke's law, but behaves as indicated by the line 21. The spring 10 initially responds from its normal or unloaded state by compressing a relatively great distance. However, as additional units of force are applied, the magnetic spring becomes more and more resistive or stiff, compressing smaller and smaller distances in response to successive units of compressive force.

Thus the magnetic spring 10 behaves for small loads or shocks as a "soft" or very resilient spring, but for large loads behaves as a "stiff" or unyielding spring.

These properties of the spring 10 will suggest to those skilled in the art many applications. There are many instances where a "soft" spring is desired for small loading variation, but a "stiff" springing is desired for large loads.

By means of illustration, and not limitation, one such application is illustrated in FIG. 5. In this case a mattress 30 comprising a large number of magnetic springs such as the magnetic spring 10 are mounted parallel and adjacent to one another with all of their upper discs 13 and all of their lower discs 14 each tied together in a lattice of cords 31. A suitable cover 32 is provided thereover.

Because of the magnetic nature of the spring it may be deemed desirable to include a magnetically conductive flexible material such as the material 33 under the cover 32 or to make the cover 32 at least in part of such material.

As should now be obvious a new and improved magnetic spring has been described that exhibits unique properties and is capable of wide application.

While particular embodiments of the invention have been shown and described, it will be obvious to those skilled in the art that changes and modifications may be made without departing from the invention in its broader aspects.

I claim:

1. A magnetic spring or shock absorber device comprising:
    a plurality of magnets each magnetized along an axis; and
    guide means for receiving said magnets adjacent to one another and for guiding the movement of said magnets;
    said magnets being oriented on said guide means so that adjacent ones of said magnets repel one another.

2. The magnetic spring or shock absorber device as defined in claim 1 in which:
    said magnets are mounted adjacent to one another on said guide means along a direction with each of their axis of magnetization approximately aligned with each other along that direction; and
    said guide means is collapsible along that direction generally coincidental with the axes of magnetization of said magnets.

3. The magnetic spring or shock absorber device as defined in claim 1 in which:
    said magnets are permanent magnets and are generally of a common size and configuration.

4. The magnetic spring or shock absorber device as defined in claim 3 in which:
    each of said magnets is of a generally annular shape;
    said axis of magnetization is the central annular axis of said magnets; and
    said guide means includes a shaft which passes through the annular openings of said magnets.

5. The magnetic spring or shock absorber device as defined in claim 2 in which:
    each of said magnets is of generally annular shape;
    said axis of magnetization is the central annular axis of said magnets; and
    said guide means includes a shaft which passes through the annular openings of said magnets.

6. The magnetic spring or shock absorber device as defined in claim 5 in which:
    said guide means is of a nonmagnetic material and includes two members which telescope into one another; and
    said magnets are formed of a ceramic magnetic material.

7. The magnetic spring or shock absorber device as defined in claim 6 in which:
    said each of said two members include tubular portions of different diameters, one tubular portion of one of said members enters the tubular portion of the other member;
    said other members tubular portion having a crimped opening of decreased diameter into which said one portion enters; and
    said one portion having an increased diameter flange at its upper end whereby said two members are prevented from easily separating from each other.

8. The magnetic spring or shock absorber device as defined in claim 7 in which:
    said plurality of annular magnets each has a planar upper and a planar lower surface one of which behaves as a north pole and the other of which behaves as a south pole;
    said guide means is made of nylon; and
    said tubular portion of said one member's increased diameter flange has a number of longitudinal slits therein to ease its entry into said other member during assembly.

9. The magnetic spring or shock absorber device as defined in claim 8 in which:

each of said two members of said guide means has a restraining disc of greater diameter than the hole in said annular magnets formed unitarily with the respective tubular portions at the far ends thereof away from the crimped or flared ends.

10. A mattress which comprises:

a plurality of individual magnetic springs or shock absorber devices of which is defined as in claim 9 in side-by-side array over a field;

said upper member restraining discs of said plurality of magnetic springs being interconnected by an upper lattice of nylon ties;

said lower member restraining discs of said plurality of magnetic springs being interconnected by a lower lattice of nylon ties; and an enveloping cover over the entire assembly.

References Cited

UNITED STATES PATENTS

| | | |
|---|---|---|
| 2,387,266 | 10/1945 | Holland. |
| 2,432,717 | 12/1947 | Berger. |
| 2,585,714 | 2/1952 | Wrobel et al. _____ 308—10 |
| 2,702,191 | 2/1955 | Lemelson _____ 273—103 |
| 2,762,373 | 9/1956 | Rosenberg _____ 129—16 |
| 3,255,470 | 6/1966 | Knittel et al. _____ 5—351 |
| 3,262,137 | 7/1966 | Beckman et al. _____ 5—353 |

CASMIR A. NUNBERG, Primary Examiner

U.S. Cl. X.R.

267—1; 297—452